Nov. 17, 1925.
O. LARSEN
1,561,868
BOTTLE FILLING AND CAPPING MACHINE
Filed Oct. 1, 1923    4 Sheets-Sheet 3
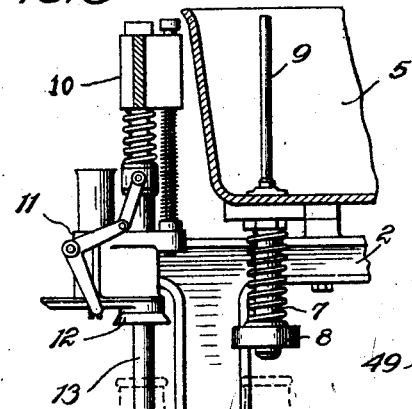
FIG. 3
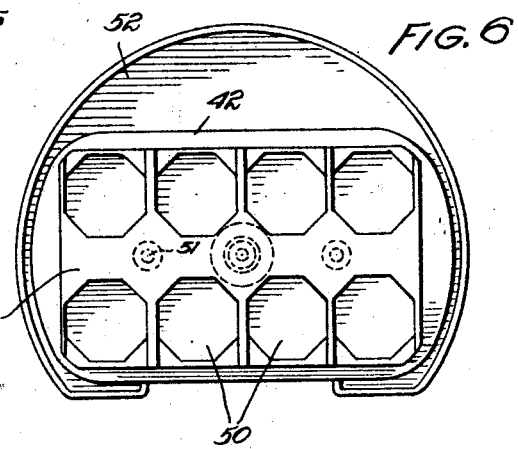
FIG. 6
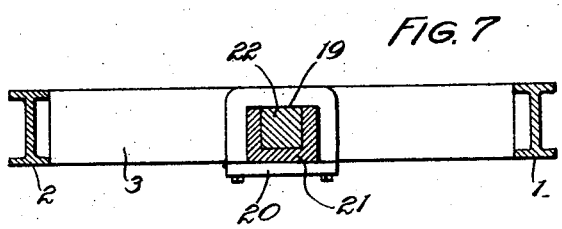
FIG. 7
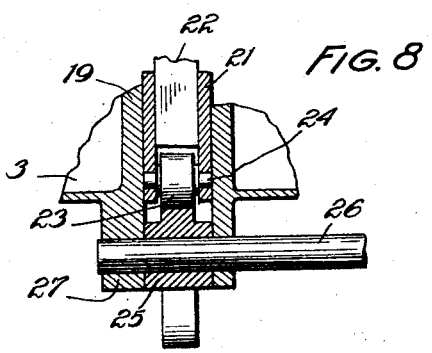
FIG. 8
FIG. 9
Inventor
Olaf Larsen

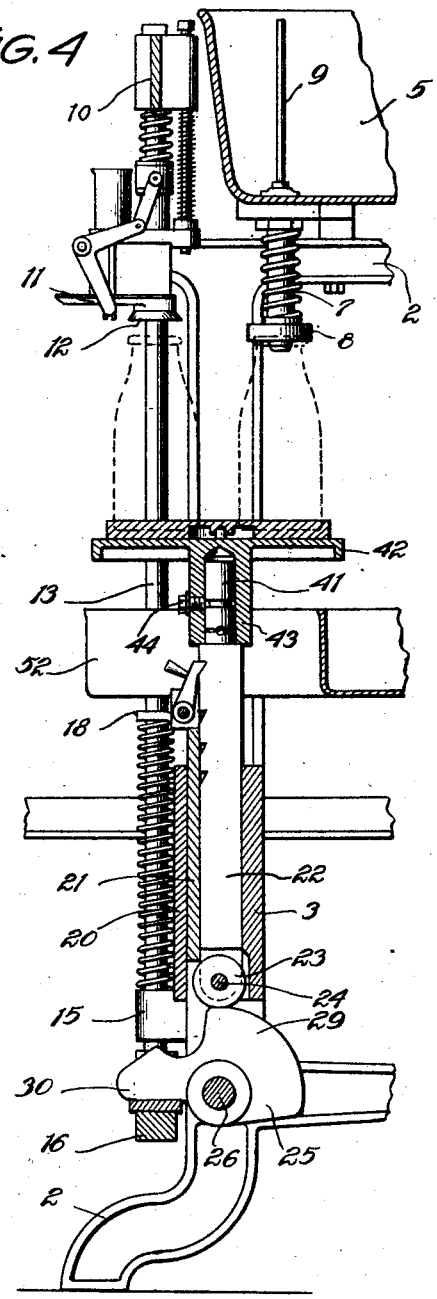

Patented Nov. 17, 1925.

1,561,868

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

BOTTLE FILLING AND CAPPING MACHINE.

Application filed October 1, 1923. Serial No. 665,988.

*To all whom it may concern:*

Be it known that I, OLAF LARSEN, a citizen of the United States, residing at Fort Atkinson, in the county of Jefferson and the State of Wisconsin, have invented certain new and useful Improvements in Bottle Filling and Capping Machines, of which the following is a specification.

The invention relates to machines for the filling of bottles with liquid and the application of closure caps thereto, and more particularly to a hand operated machine for filling and capping milk bottles.

Equipment for these purposes heretofore have been produced in power operated units of capacity suitable to the needs of large milk handling plants, or in small filling units requiring the capping to be done as a separate operation, generally by hand.

It is the principal object of this invention to provide an efficient practical machine of moderate cost, suitable to the purposes of the small sized milk plants and dairies, which will both fill and cap milk bottles, and which may be manipulated manually.

Other objects and advantages will be apparent in the following detailed description of a preferred embodiment of my invention which I have selected for illustration in the accompanying drawings. It will be understood however, that various changes in form, construction, and arrangement may be made by those skilled in the art without departing from the spirit and scope of the invention as expressed in the appended claims.

Figure 1:
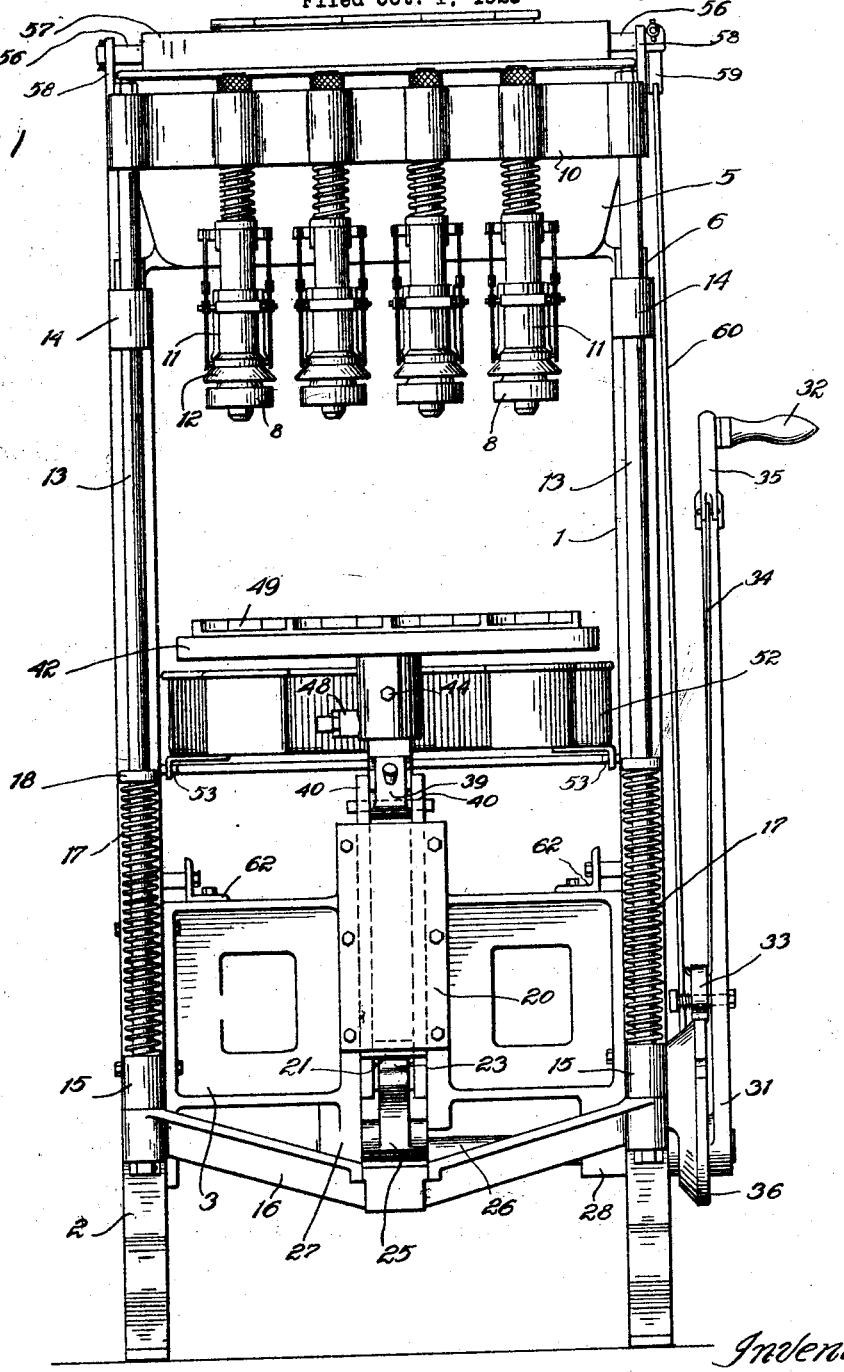
Figure 2:
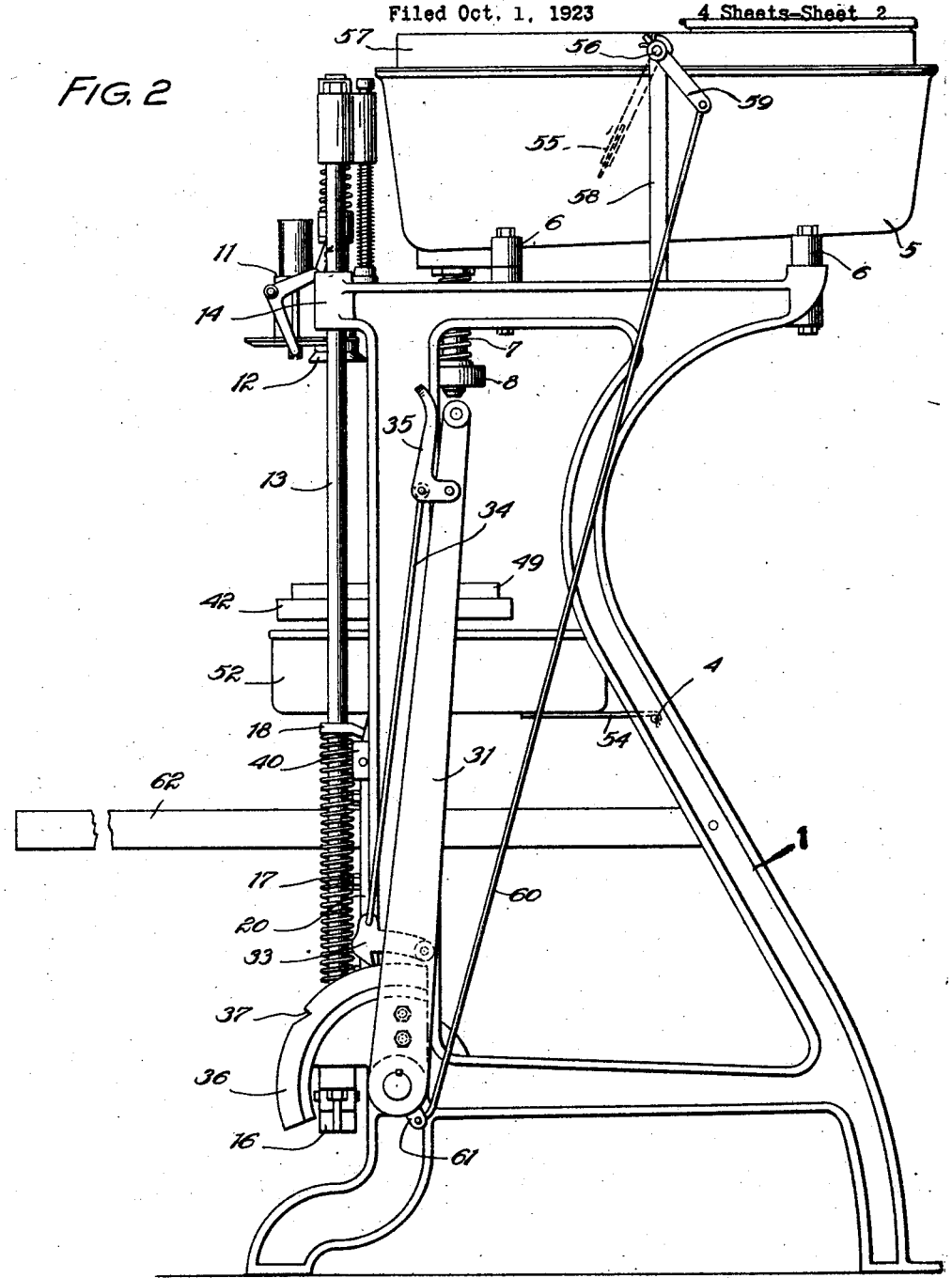

Referring to the drawings, Fig. 1 represents a front elevation of the machine. Fig. 2 is a side elevation. Figs. 3, 4 and 5 are fractional sectional elevations illustrating the filling and capping mechanisms in the several stages of operation. Fig. 6 is a detailed plan view of the bottle supporting table. Fig. 7 is a partial sectional view taken on the plane of the line 7 in Fig. 3. Fig. 8 is a fractional sectional elevation taken on the plane of the line 8 in Fig. 3. Fig. 9 is a sectional view of the table retaining detent.

Stated generally, the operative arrangement of the machine as herein illustrated comprises an elevated milk tank from which a series of filler valves are suspended, and a corresponding series of capping devices movably supported in front of the valves. A vertically reciprocatory table, adjustable to the heights of the various sizes of bottles, supports front and rear rows of bottles, and may be raised by a hand lever to engage the rear row of bottles in filling engagement with the filler valves. After filling, the table may be turned horizontally so that the rear row of filled bottles is swung forward into position beneath the capping devices, and the front row of empty bottles is swung rearward into position for filling. Upon again raising the table to engage the empty bottles, the further swing of the operating lever lowers the capping devices upon the filled bottles and caps them, whereupon a partial return of the lever releases the capping devices from the filled bottles without disengaging the bottles being filled. The operator may then remove the filled bottles and replace with a row of empties while the rear row of bottles is being filled, thus being able to lower and revolve the table as fast as the bottles are filled without any loss of time for capping them, nor additional operation required after removing the bottles from the machine.

More specifically described, with reference to the drawings, the numerals 1 and 2 indicate the side members respectively of a suitable frame, cross connected mainly by the member 3 together with suitable brace rods as at 4. A milk tank 5 is supported on the upper portions of the frame members 1 and 2, as by lugs 6 cast on the tank and bolted to the frame. The bottom of the tank is preferably inclined downwardly toward openings in the front portion thereof, in which are secured a row, herein shown as four, of similar filler valves 7.

The valves 7 may be of any suitable construction, the details of which are not material to this invention. The valve-controlled bottle-engaging outlet portions 8 of the filler valves are adapted to be raised against spring tension when engaged by a bottle elevated into engagement therewith, which operation opens the valve, admitting milk to the bottle and exhausting the air therefrom through a vent tube 9.

Positioned horizontally in front of the tank 5, is a vertically reciprocatory cross bar 10 carrying a row of capping heads 11 arranged in like number and directly in front of the filler valves. The capping devices 11 may be of any suitable construction, the details of which also are not material to this invention. In general, they are adapted to receive a supply of bottle caps which are individually seated in the mouth of a bottle raised into engagement with the bell portion 12, or as in the present instance, when the capping head is lowered upon the bottle, the device being operative with the resilient recession of the head upon its support.

The cross bar 10 is operatively supported by a pair of longitudinally reciprocatory upright rods 13 which operate through suitable upper bearings 14 and lower bearings 15 on the frame members 1 and 2. The upper ends of the rods 13 are secured in the cross bar 10, and their lower ends are rigidly cross connected by a bridge member 16, the latter being suitably adapted at its center portion for engagement by an operating cam, as hereinafter described. In normal position, the bridge 16 abuts the under sides of the bearings 15, being resiliently maintained therein by a pair of compression springs 17, mounted respectively about the rods 13 and confined between the bearings 15 and the collars 18 rigidly secured on the rods 13. The cross bar 10 is thus resiliently supported in its uppermost and normal position, with the bells 12 of the capping heads elevated substantially above the bottle engaging portions 8 of the filler valves.

The cross member 3 carries a bottle supporting table and mechanism for its operation. A vertical guideway 19 (see Fig. 7) is provided in the center portion of the member 3, the way being closed at its front by a removable plate 20. A vertically reciprocatory sleeve 21 has its bearing support in the guideway 19, and is illustrated in the present instance as being of three sided rectangular construction providing a rearwardly open internal guideway for an elevating post 22.

The side portions of the sleeve 21 are extended downward to support a roller 23 (see Fig. 8) carried on a pin 24 having its bearings in the extended portions of the sleeve. The roller 23 is in operative engagement with a rotatable cam 25, positioned therebelow and rigidly mounted on a shaft 26 having its bearings in the downwardly extended lugs 27 and 28 on the cross member 3.

The cam 25 is constructed with two lobes 29 and 30, the former operating by rotation of the shaft 26 to elevate the roller and sleeve 21, the latter operating to engage and depress the bridge member 16 connecting the rods 13. The shaft 26 extends outwardly of the frame member 1 and carries a rigidly mounted operating lever 31 extending upwardly a convenient distance and provided with a handle 32. Preferably, there is associated with the operating lever a latch 33, operable by a rod 34 and hand lever 35, the latch contacting a quadrant 36 rigidly mounted on the frame member 1 and having a notch 37 for engagement by the latch 33 positioned to secure the operating lever, until released, against reverse movement after the elevation of the bottle supporting table.

The elevating post 22 is longitudinally slidable in the sleeve 21, its relative position therein being controlled by a series of notches 38 in which a dog 39 may be selectively engaged, the dog being pivotally supported between forwardly extended wings 40 formed on the upper portion of the sleeve 21. The notches are spaced to accommodate the bottle table to the height of the several standard sizes of milk bottles.

The upper end of the post 22 carries a cylindrical extension 41 upon which is rotatably mounted a bottle supporting table 42 having an under sleeve portion 43 operatively receiving the post extension 41 and bearing downwardly on the shouldered end of the post 22. The table may be retained on its support by means of a set screw 44 mounted in the sleeve 43 and extending into an annular groove formed in the extension 41. It is preferable also to control the rotative position of the table 42, so that it may be brought to rest with the bottles alined for engagement with the filling and capping devices. To that end an annular groove 45 is provided in the post extension 41 having oppositely positioned pockets 46 (see Figs. 3 and 9) adapted to receive a spring actuated detent 47 operatively mounted in a boss 48 provided on the sleeve 43, the pockets being positioned to receive the detent when the table is properly positioned to aline the bottles.

The table 42 is preferably provided with removable grids having variously sized bottle receiving pockets to accommodate and properly position the several sizes of bottles. One of such grids is herein illustrated in position on the table at 49, having two rows of pockets 50 to receive the bottles. The grids are laterally retained preferably by upstanding pins 51 mounted on the upper surface of the table and extending into suitable recesses in the grids. An overflow receptacle 52 may be provided beneath the table 42 to receive such milk as may escape in filling the bottles, the receptacle being removably supported on pins 53 extending from the frame members and by a strap 54 engaging the brace rod 4.

Means may be provided for agitating the milk in the supply tank 5, comprising a swinging member 55 suspended in the tank and rigidly mounted on a rock-shaft 56 extending through the tank cover 57 and having outer bearings in the upright supports 58 suitably secured to the frame members 1 and 2. A crank arm 59 rigidly mounted on the shaft 56 is operatively connected by a rod 60 to a lug 61 projecting from the operating lever 31. Each operation of the lever 31 swings the member 55 through the milk and prevents separation of the cream.

A bottle case support also may be provided conveniently accessible to the operator at the front of the machine and comprising a pair of angle bars 62 spaced by the dimension of a case and adapted to receive a case therebetween on the flanges of the bars. The latter may be secured as by bolts to the cross member 3 and to the frame members 1 and 2.

In operation, a case of empty bottles is placed on the supports 62. The table 42 is adjusted to the proper height by lifting or lowering it and its support to the point of engagement of the dog 39 with the appropriate notch 38 for the particular size of bottles about to be filled. With the operating lever 31 in rearmost position and the table lowered (see Fig. 3), a row of bottles is placed in the front row of pockets 50 in the table grid, and the table turned a half revolution, whereupon the bottles are alined beneath the filler valves. By advancing the lever 31 to intermediate position wherein the latch 33 engages the notch 37, the cam lobe 29 lifts the sleeve 21, the adjusted post 22, and the table 42, and carries the bottles into engagement with the valves 8, opening the latter for the discharge of milk into the bottles (see Fig. 4).

The operator then places another row of empty bottles in the remaining pockets while the first row are being filled, the capping heads being sufficiently above the table in elevated position to permit the ready placing of bottles thereon. When the rear row of bottles are filled, the lever 31 is returned to rearmost position and the table 42 again revolved a half turn, thus bringing the filled bottles to the front beneath the capping heads 11. The lever 31 is then moved forward to intermediate position which engages the second row of bottles with the filler valves. The further forward movement of the operating lever effects the engagement of the cam lobe 30 with the bridge 16 and depresses the latter, carrying downward the rods 13, cross bar 10, and the capping heads 11, the latter engaging the filled bottles and emplacing caps therein. (See Fig. 5.)

The lever 31 is then returned to intermediate position thereby releasing the capping heads and their supports to be returned to normal uppermost position by the springs 17. The operator may then remove the filled and capped bottles, drop them in the bottle case, and replace them on the table with another row of empties, the capping, removing and replacing operations being done while the rear row of bottles are being filled. With the completion of the latter, the described operations are repeated successively.

It will now be apparent that I have provided a machine for the efficient and economical accomplishment of the purposes set forth.

I claim as my invention:

1. Apparatus of the class described comprising, in combination, a stationary supply tank, a plurality of filler valves supported on said tank and communicating therewith, a plurality of capping heads positioned in front of and normally above said filler valves, a vertically reciprocatory bar supporting said capping heads, a pair of upright reciprocatory rods carrying said support at their upper ends, a bridge member rigidly connecting their lower ends, resilient means for maintaining said rods in uppermost position, a revoluble table, a vertically reciprocatory support for said table, a rock-shaft, and a cam on the rock-shaft operable thereby to successively engage and raise said table support and to engage and depress said bridge member.

2. In apparatus of the class described, in combination, a stationary support, a vertically arranged guideway formed in said support, a vertically reciprocatory sleeve operatively positioned in said guideway, said sleeve having downward extensions of its lateral portions, a roller pivoted between said extensions, an elevating post longitudinally slidable in said sleeve, said post having a plurality of laterally positioned spaced notches, a dog pivoted on the upper end of said sleeve adapted to selectively engage said notches and support said post in relation thereto, a bottle supporting table rotatably mounted on the upper end of said post, a rock-shaft, and a cam on said rock-shaft operable thereby to engage said roller and elevate said sleeve.

3. In apparatus of the class described, in combination, a vertically reciprocatory table support, a vertically reciprocatory member having connections for the reciprocatory movement of a capping head, a rock-shaft, a cam on said rock-shaft, and a lever for the operation of said rock-shaft, said cam being adapted to engage and raise said table support during the movement of said lever from one extreme position to intermediate position, and to engage and depress said member during the movement of said lever from intermediate to the other extreme position.

4. Apparatus of the class described comprising, in combination, a stationary supply tank, a plurality of filling valves supported on said tank, a plurality of capping heads positioned laterally of said filling valves, vertically reciprocatory supporting means for said capping heads, a revoluble bottle supporting table, a vertically reciprocatory support for said table, a rock-shaft, and a cam on said rock-shaft operable thereby in engagement with said table support and said capping head supporting means to successively raise said table support, lower said capping head support, raise said capping head support, and lower said table support.

5. Apparatus of the class described comprising, in combination, a stationarily supported bottle filling valve, a movable bottle capping head positioned laterally of said valve, a revoluble table positioned beneath said valve and said head having a movable support, said table being adapted to support bottles positioned in register with said valve and said head respectively and to reverse the positions of said bottles by the rotation of said table, and means operable to raise and lower said table support and said capping head having an actuating lever, the movement of said lever in one direction causing the elevation of said table to effect engagement of said filling valve with the bottle in register therewith and the lowering of said capping head into engagement with the other of said bottles, the partial reverse movement of said lever causing the disengagement of said capping head only and the release of the bottle thereunder for removal, the further reverse movement of said lever causing the disengagement of said filling valve from the bottle positioned thereunder.

6. Apparatus of the class described comprising, in combination, a stationarily supported bottle filling valve, a bottle capping head positioned laterally of said valve having a vertically reciprocatory support, a revoluble table positioned beneath said valve and said head having a vertically reciprocatory support, said table being adapted to support bottles positioned in register with said valve and said head respectively and to reverse the positions of said bottles by the rotation of said table, and cam means having operative connections with said table support and said capping head support, said cam means being operable to raise said table and cause engagement between said filling valve and the bottle in register therewith, said cam means being further operable to cause the engagement and disengagement of said capping head with the other of said bottles during the period of engagement of the first mentioned bottle with said filling valve.

In witness whereof I have hereunto attached my signature.

OLAF LARSEN.